(12) United States Patent
Tsai

(10) Patent No.: US 6,435,528 B1
(45) Date of Patent: Aug. 20, 2002

(54) WHEEL BRAKE FOR A KICK SCOOTER

(76) Inventor: Shui-Te Tsai, No. 12, Lane 441, Pu Na Street, Chang Hua (TW)

( * ) Notice: Subject to any disclaimer, the term of this patent is extended or adjusted under 35 U.S.C. 154(b) by 0 days.

(21) Appl. No.: 09/685,801

(22) Filed: Oct. 11, 2000

(51) Int. Cl.$^7$ ................................................ B62M 1/00
(52) U.S. Cl. ................................................ 280/87.041
(58) Field of Search .................... 280/87.01, 87.021, 280/87.041, 87.042, 87.05, 842; 188/2 D, 19, 29, 68, 73.1, 250 E; 267/154, 155

(56) References Cited

U.S. PATENT DOCUMENTS

| | | | | |
|---|---|---|---|---|
| 1,531,710 A | * | 3/1925 | McLaren | 188/2 R |
| 4,179,134 A | * | 12/1979 | Atkinson | 280/87.04 |
| 4,553,641 A | * | 11/1985 | Scott et al. | 188/24.22 |
| 4,595,214 A | * | 6/1986 | Downing | 280/296 |
| 5,039,121 A | * | 8/1991 | Holter | 280/220 |
| 5,620,189 A | * | 4/1997 | Hinderhofer | 280/5.24 |
| 5,927,441 A | * | 7/1999 | Luo | 188/19 |
| 6,120,044 A | * | 9/2000 | Tsai | 280/87.05 |
| 6,213,561 B1 | * | 4/2001 | Witthaus | 301/6.1 |

* cited by examiner

Primary Examiner—Brian L. Johnson
Assistant Examiner—Gerald B Klebe
(74) Attorney, Agent, or Firm—Browdy and Neimark, P.L.L.C.

(57) ABSTRACT

A wheel brake installed in the front fork of a kick scooter and driven by a brake lever through a brake cable to stop the front wheel of the kick scooter, the front brake including a brake member pivoted to the front fork of the kick scooter above the front wheel, the brake member having a transverse axle projecting out of two sides thereof in the middle and pivoted to the front fork of the kick scooter, a front brake shoe disposed at a front side thereof, the front brake shoe having a brake face adapted for pressing on the periphery of the front wheel of the kick scooter to stop the front wheel of the kick scooter from rotation, and a rear actuating base disposed at a rear side thereof and fastened to the brake cable for enabling the brake member to be pulled by the brake lever to force the brake face against the periphery of the front wheel of the kick scooter; and spring means connected between the front fork of the kick scooter and the brake member to hold the brake member in the non-operative position where the brake face is spaced away from the periphery of the front wheel of the kick scooter.

3 Claims, 4 Drawing Sheets

WHEEL BRAKE FOR A KICK SCOOTER

BACKGROUND OF THE INVENTION

The present invention relates to kick scooters and, more specifically, to a wheel brake for a kick scooter.

Early kick scooters do not have brake means. When stopping movement, the rider must press the leg upon the ground. However, it is difficult to maintain balance when pressing the leg upon the ground to stop movement. In order to eliminate this problem, the inventor invented a wheel brake for kick scooter (under Taiwanese Utility Model Patent Application #088201817). This structure of wheel brake comprises a wheel guard pivoted to the rear side of the footplate of the kick scooter near the rear wheel, and spring means mounted on the rear side of the footplate and connected to the wheel guard to lift the wheel guard away from the rear wheel. When pressing down the wheel guard with the foot to compress the spring means, a part of the wheel guard is forced against the periphery of the rear wheel, and the rear wheel is stopped from rotation.

SUMMARY OF THE INVENTION

The present invention provides a wheel brake for a kick scooter, which stops the wheel from movement by means of the control of a brake lever. According to one aspect of the present invention, the wheel brake comprises a brake member, and a spring means. The brake member comprises a transverse axle projecting out of two sides thereof in the middle and pivoted to the front fork of the kick scooter above the front wheel, a front brake shoe disposed at a front side thereof, the front brake shoe having a brake face adapted for pressing on the periphery of the front wheel of the kick scooter to stop the front wheel of the kick scooter from rotation, and a rear actuating base disposed at a rear side thereof and fastened to the brake cable for enabling the brake member to be pulled by the brake lever to force the brake face against the periphery of the front wheel of the kick scooter. The spring means is connected between the front fork of the kick scooter and the brake member to hold the brake member in the non-operative position where the brake face is spaced away from the periphery of the front wheel of the kick scooter. According to another aspect of the present invention, the spring means comprises two coil portions at two distal ends thereof, the coil portions each having a retaining tip respectively fastened to the front fork of the kick scooter, and a substantially inverted U-shaped bearing portion connected between the coil portions and bridged over the brake member to hold the front brake shoe of the brake member away from the front wheel of the kick scooter.

DETAILED DESCRIPTION OF THE PREFERRED EMBODIMENT

Figure 1:
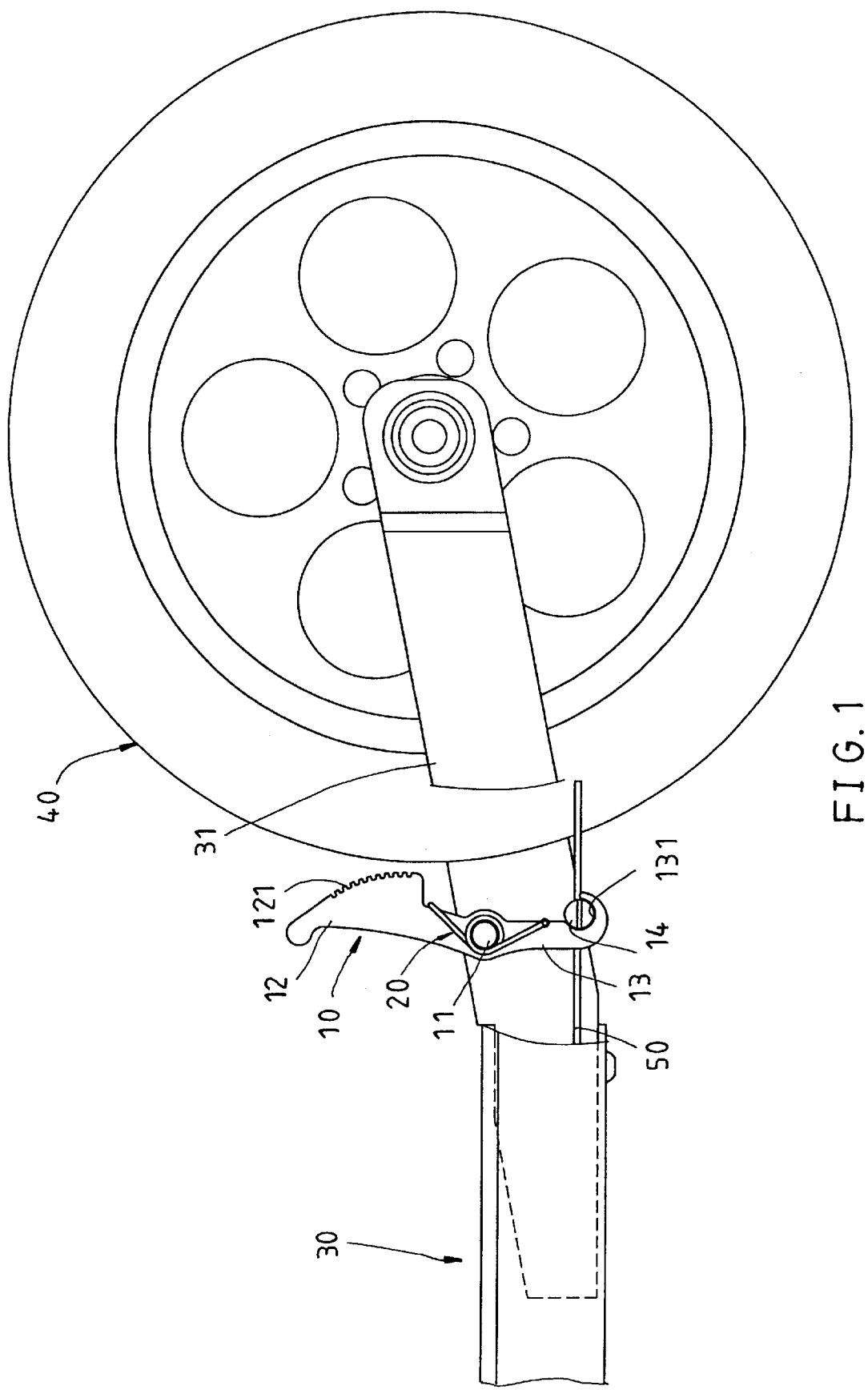
FIG. 1 is a side view of the present invention.
Figure 2:
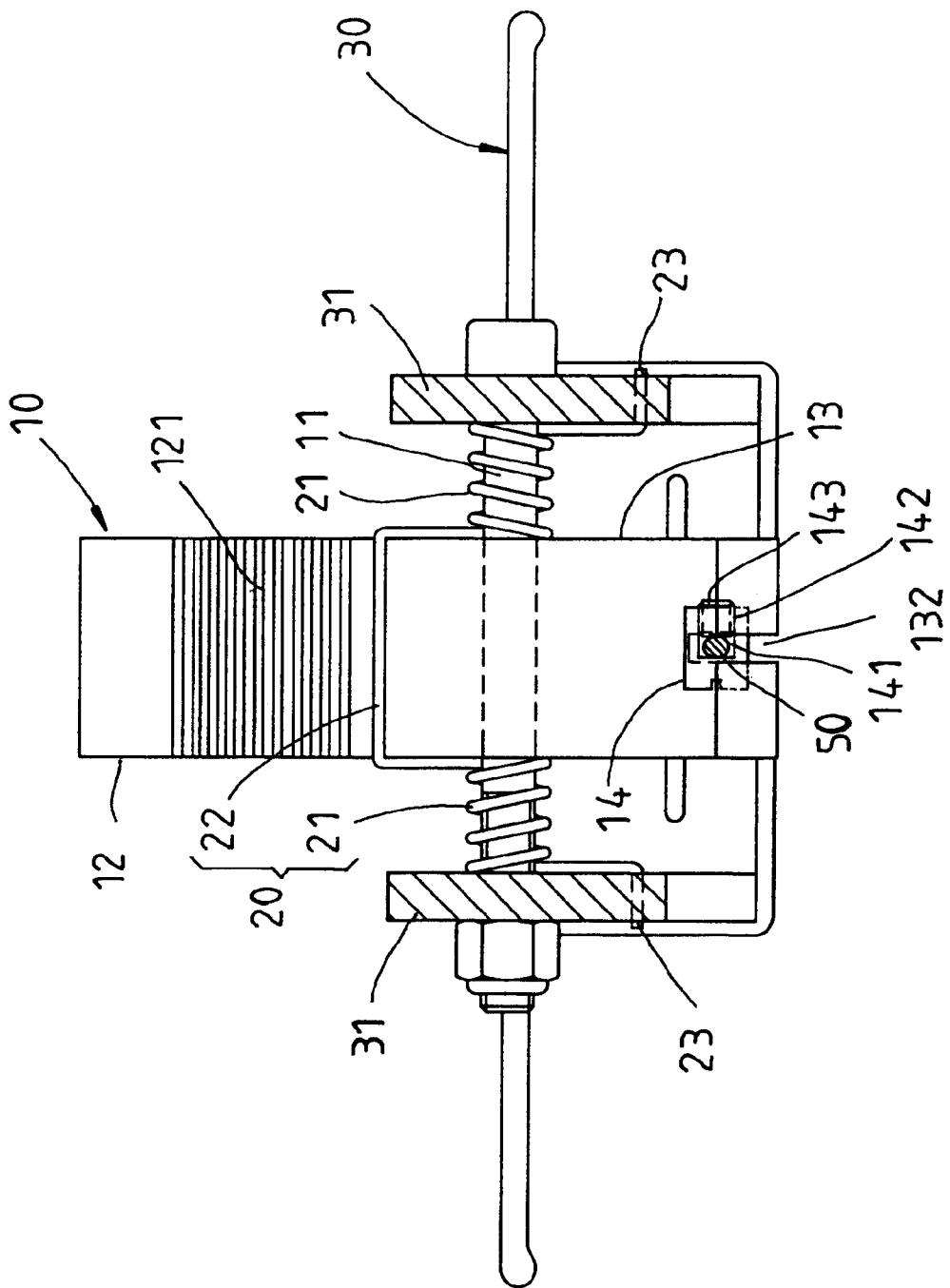
FIG. 2 is a sectional view of the present invention.

Referring to FIGS. 1 and 2, a wheel brake for a kick scooter in accordance with the present invention is generally comprised of a brake member 10, a locating member 14, a holding down member 143, a spring member 20, and a brake cable 50. The brake member 10 is an elongated block comprising a transverse axle 11 projecting out of the two sides thereof in the middle, a front brake shoe 12 at the front side thereof in front of the transverse axle 11, and a rear actuating base 13 at the rear side thereof behind the transverse axle 11. The front brake shoe 12 has a brake face 121 curved outwards. The brake face 121 is preferably embossed with transverse grooves arranged in parallel. The rear actuating base 13 has a transverse grove 131 and a through hole 132 perpendicularly extended through the transverse groove 131 on the middle. A locating member 14 is mounted in the transverse groove 131 of the rear actuating base 13 of the brake member 10, having a threaded locating hole 142 and a through hole 141 through one end of the locating hole 142. The holding down member 143 is a holding down screw adapted for threading into the threaded locating hole 142 of the locating member 14. The spring member 20 is a torsional spring having two coil portions 21 at two ends, and a substantially inverted U-shaped bearing portion 22 connected between the coil portions 21. The coil portions 21 each have one end connected to the bearing portion 22, and an opposite end terminating in a retaining tip 23.

The transverse axle 11 of the brake member 10 is pivoted to the front fork 31 of the kick scooter 30, keeping the brake face 121 of the front brake shoe 12 of the brake member 10 aimed at the periphery of the wheel 40. The brake cable 50 is inserted through the through hole 132 of the rear actuating base 13 of the brake member 10 and the through hole 141 of the locating member 14, and then secured thereto by the holding down screw 143. The holding down screw 143 is threaded into the threaded locating hole 142 to hold down the brake cable 50. The retaining tip 23 of each coil portion 21 of the spring member 20 is respectively fastened to the front fork 31 of the kick scooter 30, and the bearing portion 22 of the spring member 20 is stopped at the brake shoe 12 of the brake member 10. Because of the effect of the spring member 20, the brake member 10 is held in the initial position with the brake face 121 spaced from the periphery of the wheel 40 at a distance.

When the kick scooter rider presses the brake lever to pull the brake cable 50, the locating member 14 is lifted with the brake cable 50, thereby causing the brake member 10 to turn about the axis of the transverse axle 11 in one direction to force the brake face 121 against the periphery of the wheel 40, and therefore the wheel 40 is stopped. When the kick scooter rider releases the brake lever, the spring member 20 immediately returns to its former shape, therefore causing the brake member 10 to turn about the axis of the transverse axle 11 in the reversed direction, and therefore the brake face 121 of the brake member 10 is moved away from the periphery of the wheel 40 and returned to the initial position.

Figure 3:
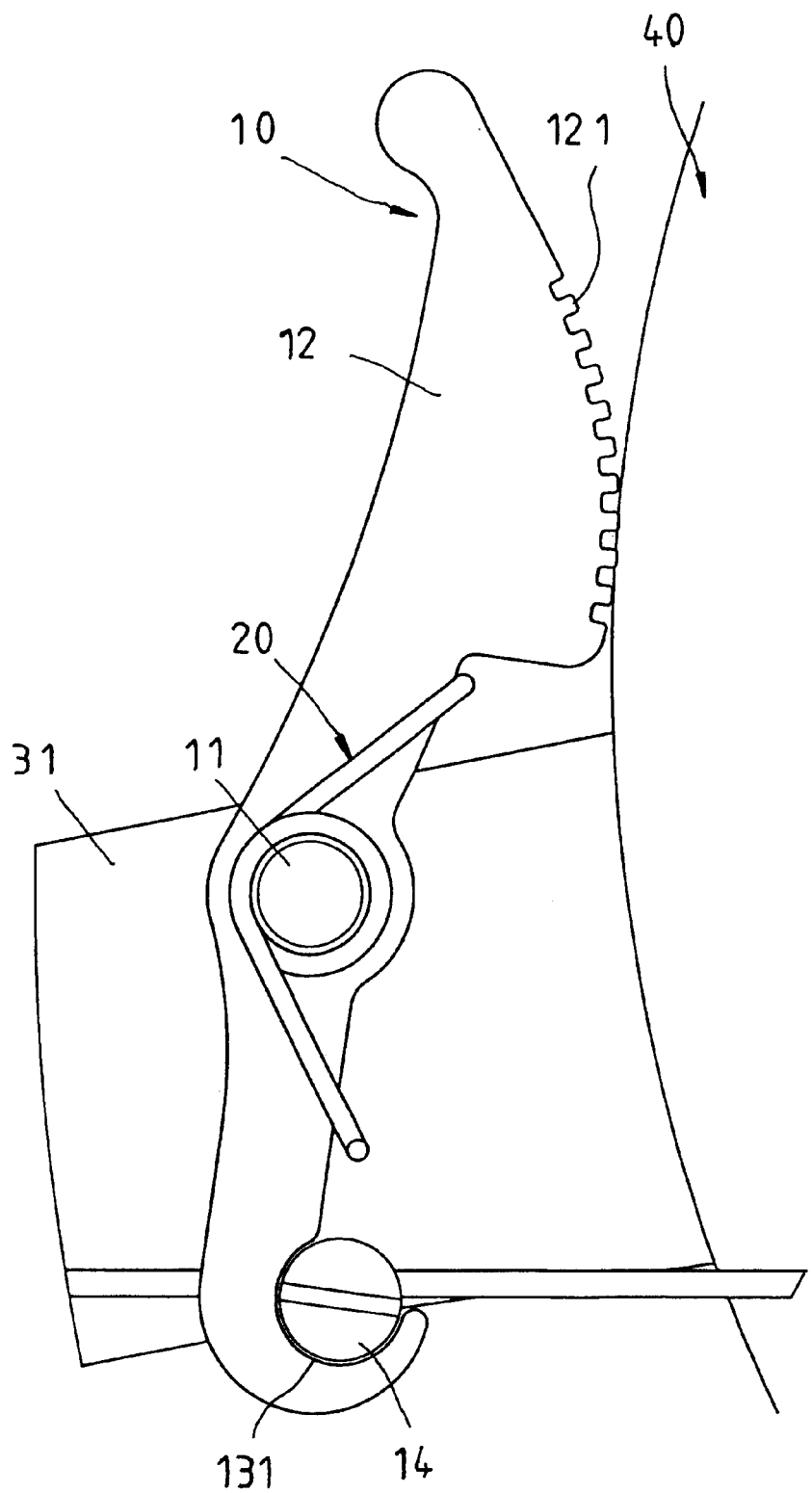
FIG. 3 is an applied view of the present invention, showing a lower part of the brake face forced into contact with the periphery of the wheel.
Figure 4:
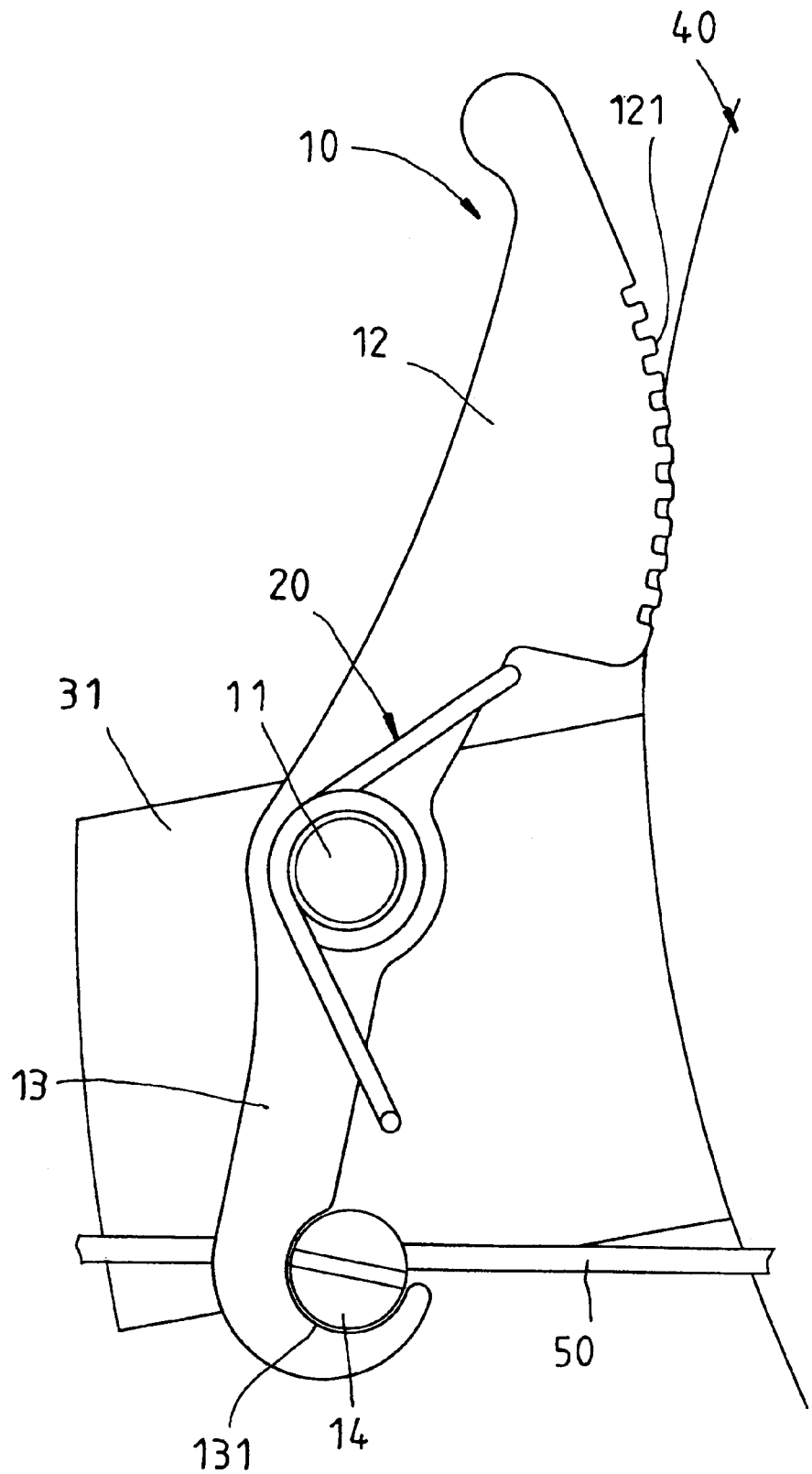
FIG. 4 is similar to FIG. 3 but showing much area of the brake face of the front brake shoe of the brake member compressed against the periphery of the wheel.

Referring to FIGS. 3 and 4, because the brake face 121 of the front brake shoe 121 of the brake member 10 curves outwards, the kick scooter rider can employ different friction resistance to the wheel 40. When slightly pressing the brake lever, only a lower part of the brake face 121 is forced into contact with the periphery of the wheel 40, as shown in FIG. 3, and less friction resistance is produced between the brake face 121 of the front brake shoe 12 of the brake member 10 and the periphery of the wheel 40, and the running speed of the kick scooter is slowed down. When pressing the brake lever with heavy force, as shown in FIG. 4, much area of the brake face 121 of the front brake shoe 12 of the brake member 10 is compressed against the periphery of the wheel 40, and therefore the wheel 40 is suddenly stopped.

While only one embodiment of the present invention has been shown and described, it will be understood that various modifications and changes could be made thereunto without departing the spirit and scope of the invention disclosed. For example, the brake cable 50 can be directly fastened to the rear actuating base 13 of the brake member 10 without the holding down member 143 and the locating member 14; a regular torsional spring may be used instead of the aforesaid particularly shaped torsional spring 20.

What the invention claimed is:

1. A wheel brake installed in a fork of a kick scooter and driven by a brake lever through a brake cable to stop a wheel of a kick scooter from rotation, the wheel brake comprising:
   a brake member pivoted to the fork of said kick scooter for selective engagement with said wheel, said brake member comprising
      a transverse axle projecting out of two sides of said brake member in the middle of said brake member and pivoted to said fork of said kick scooter,
      a brake shoe on one part of said brake member having a brake face adapted for pressing on the periphery of the wheel of said kick scooter to stop the wheel of said kick scooter from rotation, and
      an actuating base on another part of said brake member, fastened to said brake cable for enabling said brake member to be pulled by said brake lever to force said brake face against the periphery of the wheel of said kick scooter;
   spring means connected between the fork of said kick scooter and said brake member to hold said brake member in the non-operative position where said brake face is spaced away from the periphery of the wheel of said kick scooter;
   wherein the brake face of the brake shoe of said brake member is convexly curved and is embossed with a pattern of grooves,
      further comprising a locating member mounted in the rear actuating base of said brake member, said locating member having a threaded locating hole and a through hole extended through one end of said threaded locating hole for the passing of said brake cable, and a holding down screw adapted to be threaded into the threaded locating hole of said locating member to hold down said brake cable in the through hole of said locating member for enabling said brake member to be turned by said brake cable.

2. The wheel brake of claim 1 wherein the actuating base of said brake member comprises a transverse groove, which receives said locating member, and a through hole perpendicularly extending through said transverse groove for the passing therethrough of said brake cable.

3. A wheel brake installed in a fork of a kick scooter and driven by a brake lever through a brake cable to stop a wheel of a kick scooter from rotation, the wheel brake comprising:
   a brake member pivoted to the fork of said kick scooter for selective engagement with said wheel, said brake member comprising
      a transverse axle projecting out of two sides of said brake member in the middle of said brake member and pivoted to said fork of said kick scooter,
      a brake shoe on one part of said brake member having a brake face adapted for pressing on the periphery of the wheel of said kick scooter to stop the wheel of said kick scooter from rotation, and
      an actuating base on another part of said brake member, fastened to said brake cable for enabling said brake member to be pulled by said brake lever to force said brake face against the periphery of the wheel of said kick scooter;
   spring means connected between the fork of said kick scooter and said brake member to hold said brake member in the non-operative position where said brake face is spaced away from the periphery of the wheel of said kick scooter;
   wherein the brake face of the brake shoe of said brake member is convexly curved and is embossed with a pattern of grooves,
   wherein said spring means comprises two coil portions at two distal ends thereof, said coil portions each having a retaining tip respectively fastened to the fork of the kick scooter, and a substantially inverted U-shaped bearing portion connected between said coil portions and bridged over said brake member to hold the brake shoe of said brake member away from the wheel of the kick scooter.

* * * * *